(12) United States Patent
Knape, Jr.

(10) Patent No.: US 8,109,109 B2
(45) Date of Patent: Feb. 7, 2012

(54) SYSTEM FOR COOLING RESIDENTIAL STRUCTURES SUCH AS GARAGES AND ATTICS

(76) Inventor: Weldon Louis Knape, Jr., Chandler, AZ (US)

( * ) Notice: Subject to any disclaimer, the term of this patent is extended or adjusted under 35 U.S.C. 154(b) by 525 days.

(21) Appl. No.: 12/138,047

(22) Filed: Jun. 12, 2008

(65) Prior Publication Data
US 2008/0308253 A1    Dec. 18, 2008

Related U.S. Application Data

(60) Provisional application No. 60/943,615, filed on Jun. 13, 2007.

(51) Int. Cl.
*F25D 23/12* (2006.01)
(52) U.S. Cl. .......................... 62/259.4; 62/274
(58) Field of Classification Search .............. 62/259.4, 62/91, 121, 274, 314; 165/47, 104.34, 120, 165/108; 261/151, 152
See application file for complete search history.

(56) References Cited

U.S. PATENT DOCUMENTS

| | | | | | |
|---|---|---|---|---|---|
| 4,080,410 | A | * | 3/1978 | Goettl | 261/97 |
| 4,101,609 | A | * | 7/1978 | Sumrow | 261/105 |
| 4,439,375 | A | * | 3/1984 | Koble, Jr. | 261/29 |
| 4,951,480 | A | * | 8/1990 | Brence | 62/304 |
| 5,560,219 | A | * | 10/1996 | Vegara | 62/241 |
| 5,857,350 | A | * | 1/1999 | Johnson et al. | 62/314 |
| 6,598,414 | B1 | * | 7/2003 | Cline | 62/314 |
| 6,887,149 | B2 | * | 5/2005 | Palmer et al. | 454/284 |
| 2005/0186899 | A1 | * | 8/2005 | Palmer et al. | 454/201 |

FOREIGN PATENT DOCUMENTS

JP    3-51645 A   *   3/1991

OTHER PUBLICATIONS

Abstract of Jp 3-51645 A to Nakatani et al.*
U.S. Global Resources, Cooling Pads, http://www.cooling-pads.usgr.com/cooling-pads.html, at of Jun. 5, 2008.

* cited by examiner

*Primary Examiner* — Mohammad Ali
(74) *Attorney, Agent, or Firm* — Venable, Campillo, Logan & Meaney, P.C.

(57) ABSTRACT

The present invention relates generally to a system for cooling residential spaces, such as a garage. The preferred embodiment of the invention comprises a steel security door modified with evaporative media to cool incoming air, a water supply and re-circulating subsystem and a large fan to move fresh air through the cool door, into one or more residential spaces, such as a garage and/or an attic.

12 Claims, 9 Drawing Sheets

Airflow

Damper Vent

Aluminum Sump

View A-A

Side Cut View

SYSTEM FOR COOLING RESIDENTIAL STRUCTURES SUCH AS GARAGES AND ATTICS

CROSS-REFERENCE TO RELATED APPLICATIONS

This non-provisional application claims benefit of U.S. Provisional Patent Application Ser. No. 60/943,615 filed by inventor Weldon Knape on Jun. 13, 2007.

FIELD OF THE INVENTION

The present invention relates generally to cooling residential structures, such as a garage or an attic. More specifically, the preferred embodiment of invention relates to cooling a residential structure by modifying a security door with cooling media and using a fan to pull fresh air through the media and expelling cooled air into the second residential space, such as an attic.

SUMMARY OF THE INVENTION

The invention is summarized below only for purposes of introducing embodiments of the invention. The ultimate scope of the invention is to be limited only to the claims that follow the specification.

Generally, the invention is incorporated into a system for cooling interior residential spaces. As such, the invention provides an efficient and economical solution for cooling a residential garage. In addition, the invention provides a solution that can be adapted to existing residential structures and continue to comply with local ordinances, including those imposed by a homeowner's association.

In the preferred embodiment, outside air is pulled in through a door containing evaporative cooling media, which is kept damp by a re-circulating water system. The air is pulled in by a large fan preferably mounted in the garage ceiling, which then exhausts the air into the garage attic. Among other things, the invention solves the problem of residential garages becoming uninhabitable during very warm or hot days. It is an economical solution for cooling garages and similar structures in arid climates.

It is an object of this invention to cool a garage to a comfortable level during very hot days, making it a useable area as a shop, exercise room, game room, family room, hobby room etc.

It is an object of this invention to satisfy neighborhood and community restrictions by utilizing what appears to be a conventional security door for cooling rather than mounting the cooler on the exterior of the structure as typically done with conventional evaporative coolers.

It is an object of this invention to continuously supply cooled fresh outside air to the interior rather than re-circulate room air, which that gets stale and humid, when using typical portable evaporative coolers.

It is an object of this invention to vent cool air into the attic of the garage and, depending on the structure, the house, to reduce attic temperature and reduce energy consumption by increasing house air conditioning system efficiency.

It is an object of this invention to utilize part of the cooling system as a steel security door.

DETAILED DESCRIPTION OF THE PREFERRED EMBODIMENT

Figure 1:
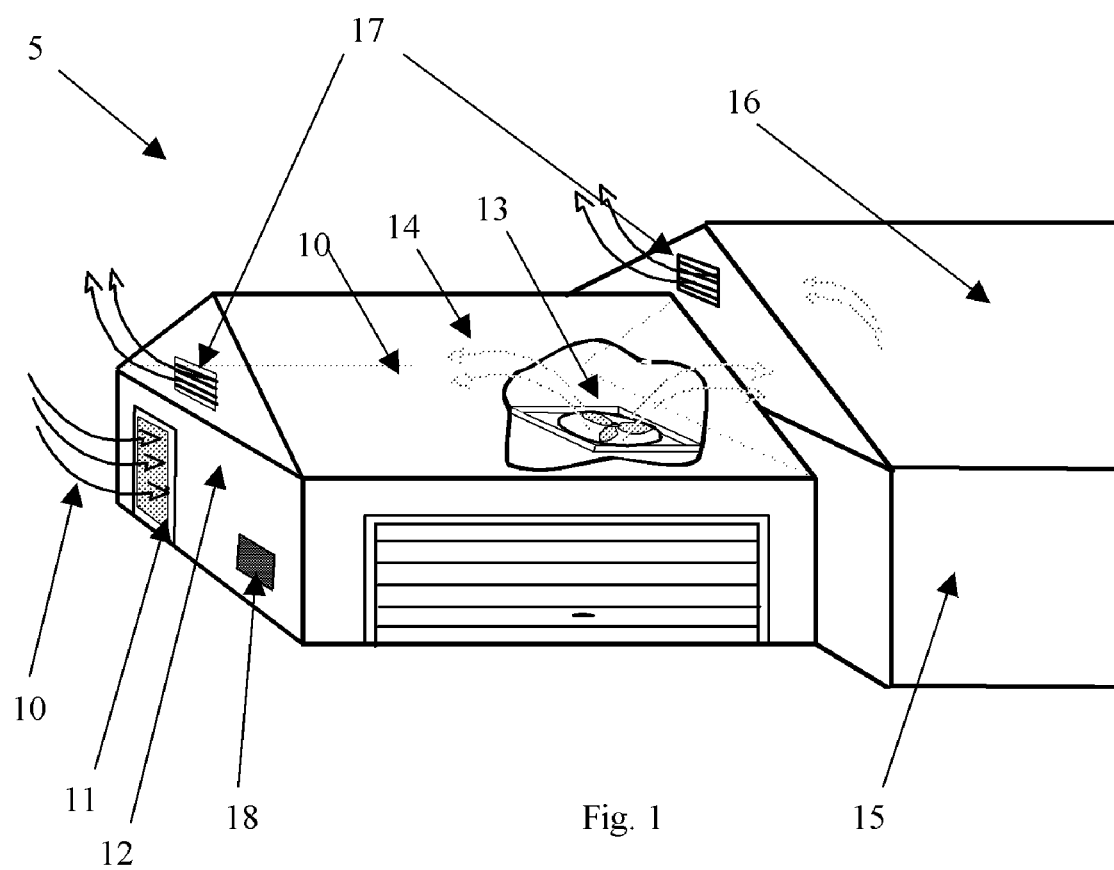
FIG. 1 illustrates airflow through a preferred embodiment of the system.

It is to be understood that the descriptions below are merely illustrative of the presently preferred embodiments of the invention and that no limitations are intended to the detail of construction or design herein shown other than as defined in the appended claims. While the invention is described in detail with reference to one or more particular preferred embodiments, persons possessing ordinary skill in the art to which this invention pertains will appreciate that various modifications and enhancements may be made without departing from the spirit and scope of the claims that follow.

In this specification, the term "cool door" refers to the door having the evaporative media. In this specification, the term "unit" refers to the frame 51 and related components of the cooling unit of the cool door. In this specification, the term "structure" refers to the garage or similar building or room in which the cool door will be installed. While "garage" and "structure" are sometimes used interchangeably, a "garage" is only the preferred embodiment of the invention and not intended to limit the breadth of the broader term "structure." All drawn dimensions are expressed in inches. Machine screws are preferably ¼×20 stainless steel.

OVERVIEW

The system described below is an economical solution for cooling garages and similar structures in arid climates. It solves the problem of the structure becoming unbearably hot. The interior of the garage is cooled to a comfortable level during very hot days, making it a useable area as a shop, exercise room, game room, hobby room etc.

Unlike conventional evaporative coolers mounted on the exterior of the structure, from the outside, the cool door appears to be a typical security door, satisfying many neighborhood restrictions. Unlike conventional portable evaporative coolers that re-circulate room air that gets stale and very humid, this system continuously supplies cooled fresh outside air. Cooled air is vented into the attic of the garage, and, depending on the structure, the house, where it reduces the attic temperature potentially reducing energy consumption by rendering the house air conditioning system more efficient. Providing that a lock set with a dual tumbler dead bolt lock is utilized, the cool door also serves as a steel security door.

Generally, the invention is incorporated into a system for cooling interior residential spaces (the "system"). The preferred embodiment of the system cools a residential structure, such as a garage 12. The typical residential structure has walls, a roof and a floor that form the exterior of the structure. For the purpose of this specification, however, the term "exterior" means any barrier between the inside of the residential space and an area outside of the residential space. Thus, the exterior could be an outside wall or it could also be a ceiling that separates the interior residential space from an attic.

In the preferred embodiment the exterior has two portals capable of permitting airflow between the inside and the outside of the residential space. The first portal is a door 11 suitable for residential use. The door 11 has a frame 51 that houses evaporative media 28. A re-circulating water system is in fluid communication with the evaporative media 28. A water supply is connected to the re-circulating water system.

In the preferred embodiment, a second portal houses a fan 13 capable of pulling outside fresh air through the media located in the door and into the residential structure while pushing air from the inside the residential structure to outside the residential structure.

Air Flow

Figure 1A:
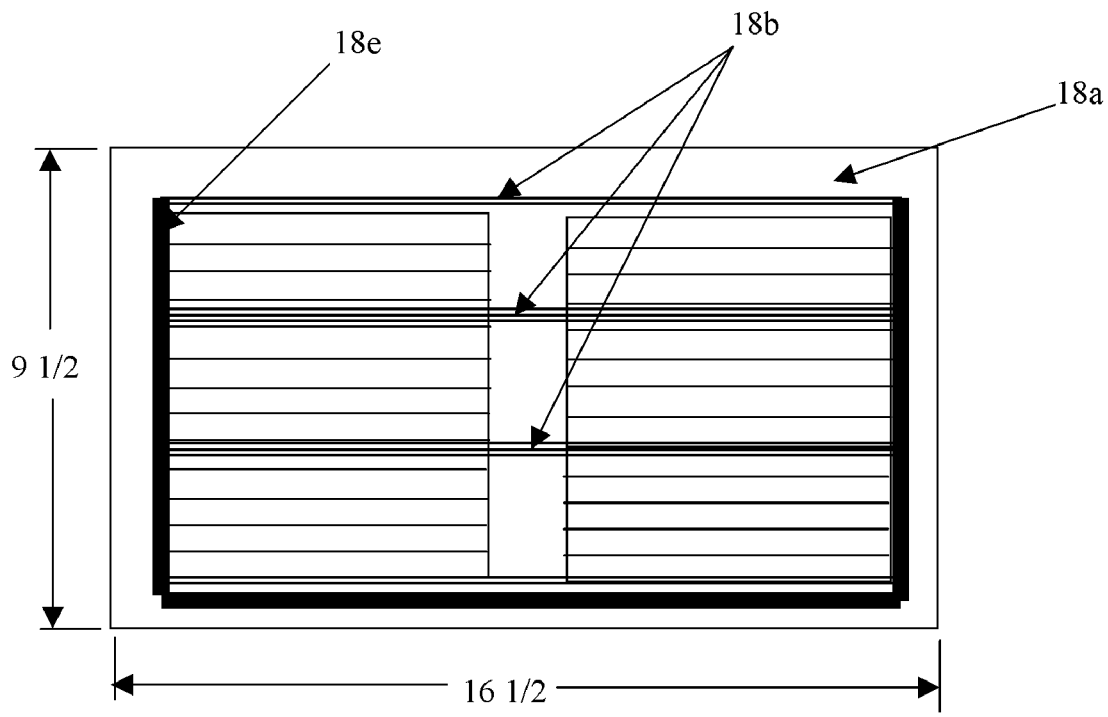
FIG. 1A illustrates a preferred embodiment of modification to an outside air vent.
Figure 1B:
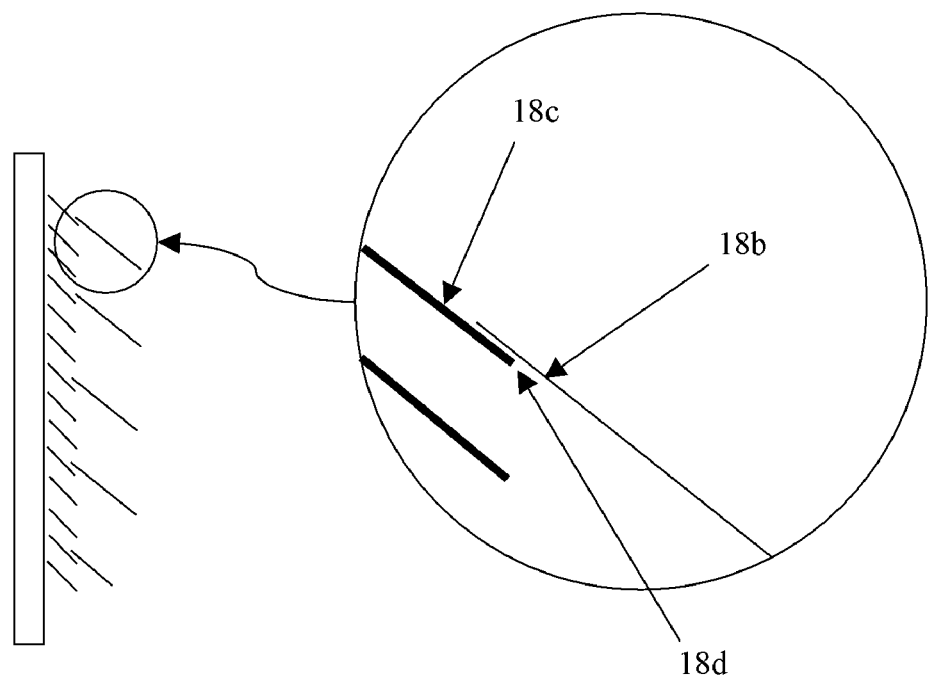
FIG. 1B illustrates a preferred embodiment of attachment of damper flaps.

Turning now to FIG. 1, outside fresh air 10 is drawn in by the fan through the cool door 11, which can drop temperature at the media 28 by 20-30 degrees. The cooled air is circulated through the garage 12, reducing the temperature in a typical garage by 15-20 degrees or more. The fan 13 exhausts the cooled air 14 into the attic 15 above the garage 12 and, depending on the structure of the house 15, on into the house attic 16. The air exits through attic vents 17. Garage vents 18 can be modified (FIG. 1A & B) to function as reverse flow dampers such that they close while the system 5 is in operation and reopen when it is turned off.

Water Circulation

Water enters the system (FIG. 2) into the aluminum sump assembly 20 via a float valve 21 plumbed into the household water supply 22. The float valve maintains the water level 23 just below the overflow tube 24. A submersible pump 25 delivers water to the distribution tube 26 via the supply tube 27. The distribution tube 26, which is surrounded on all sides by media 28, supplies water evenly across the top of the media to insure that the media is wetted consistently across its surface. The water trickles down through the media 28, which maximizes surface area, which in turn maximize the evaporative cooling process. As the remaining water progresses to the bottom of the media, it is collected and returned to the sump via the drain tube 29. In the sump, water lost through evaporation is replenished from the water source, and is then circulated through the system. Each time the pump is turned off, the remaining water in the media drains back to the sump causing a corresponding volume of water to be expelled through the drain tube 24. By periodically flushing out and replacing part of the water, the tendency for the water to accumulate high levels of minerals is reduced.

Installation

Figure 2:
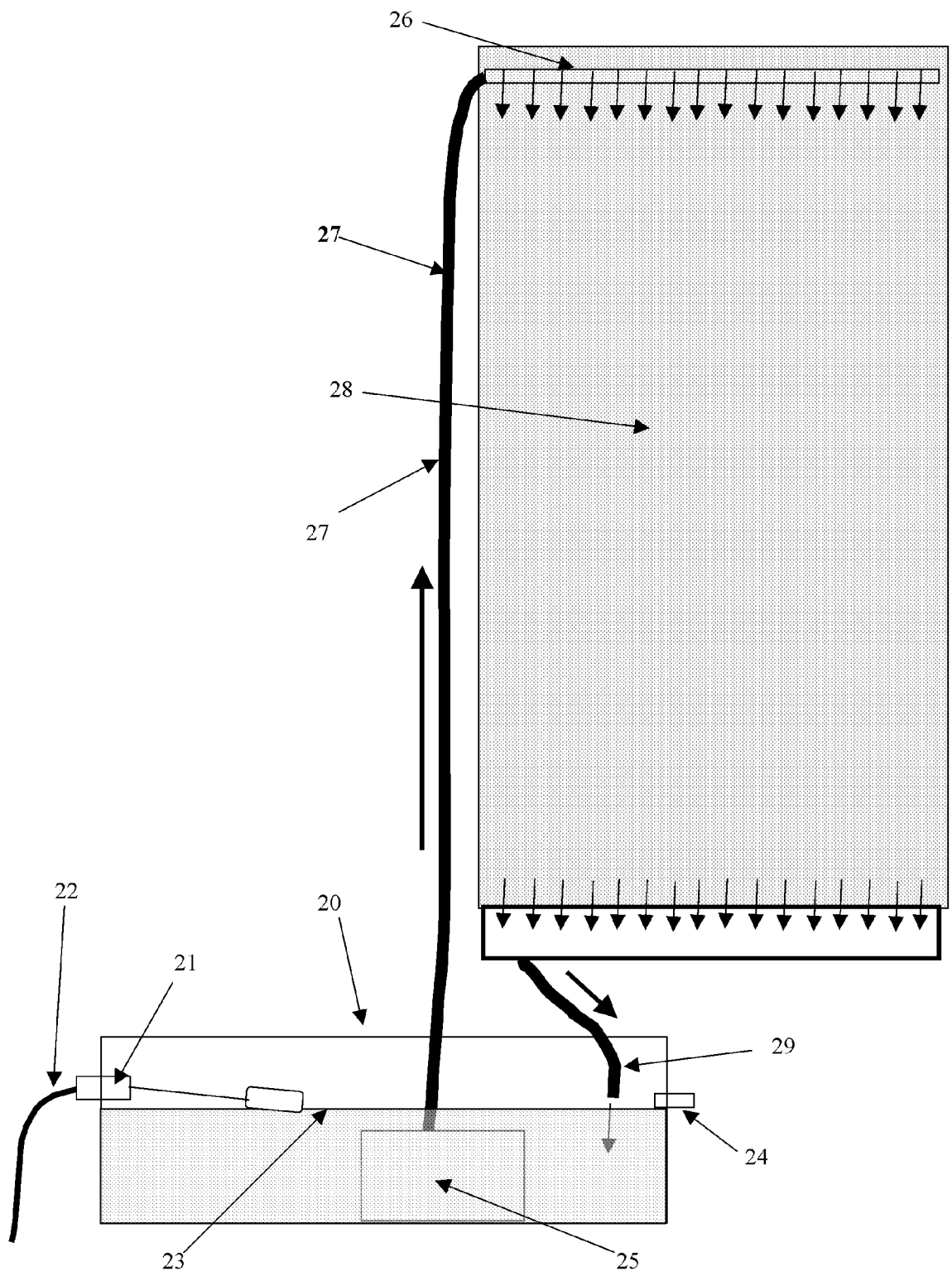
FIG. 2 illustrates a preferred embodiment of a re-circulating water system.
Figure 2A:
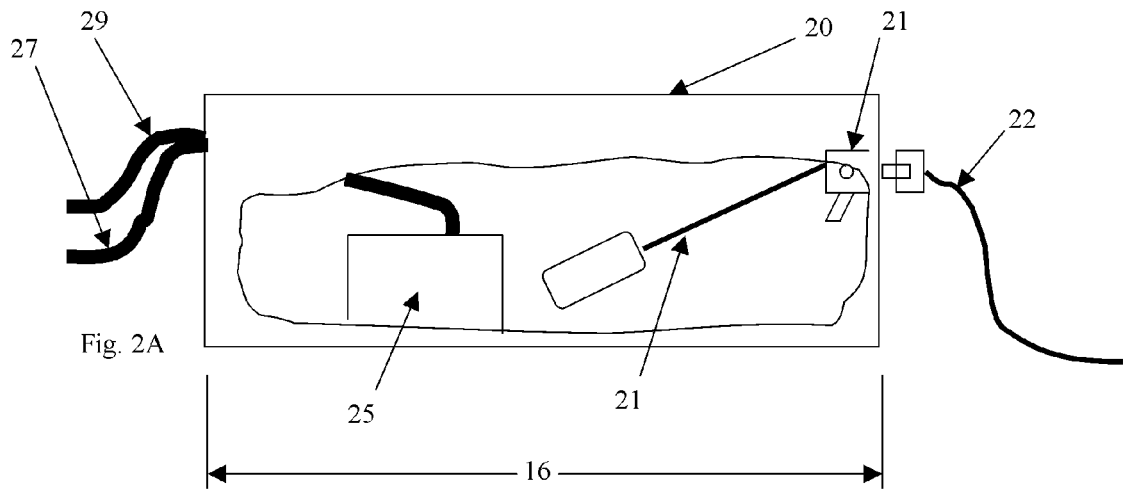
FIG. 2A illustrates a preferred embodiment of the sump assembly from a side view.
Figure 5:
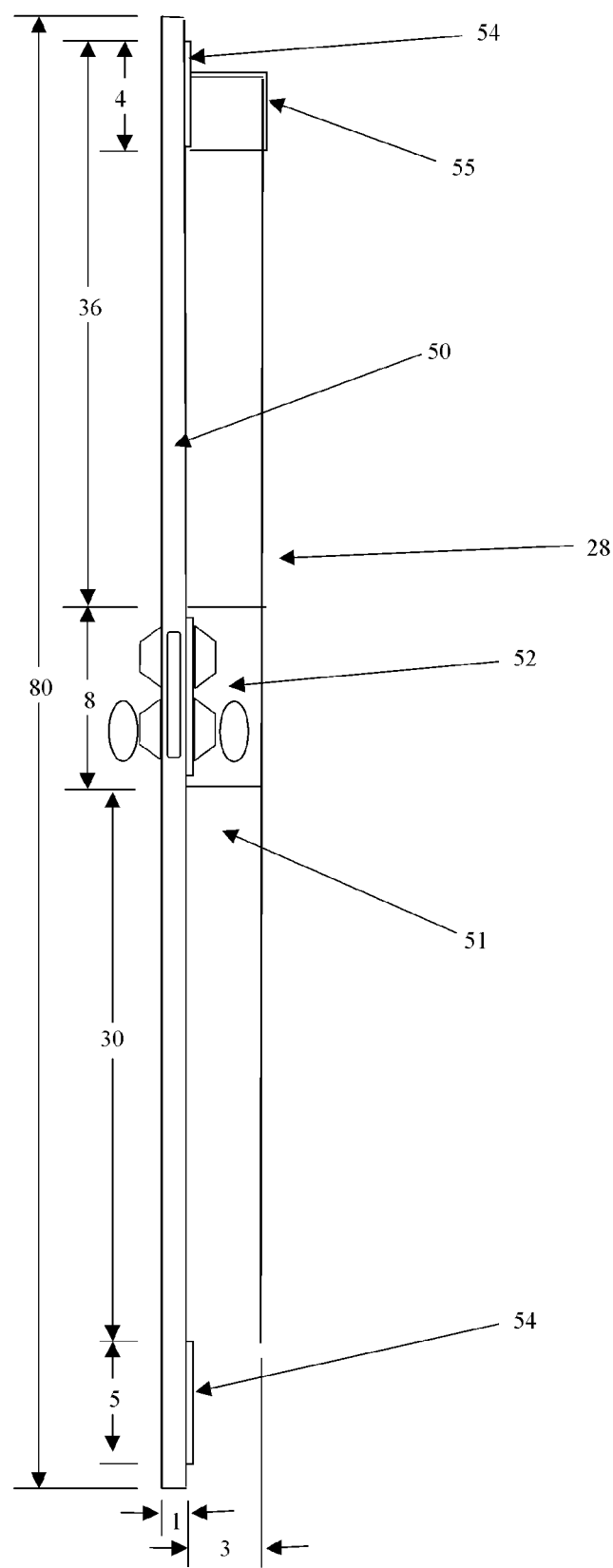
FIG. 5 illustrates a preferred embodiment from the side view.
Figure 6:
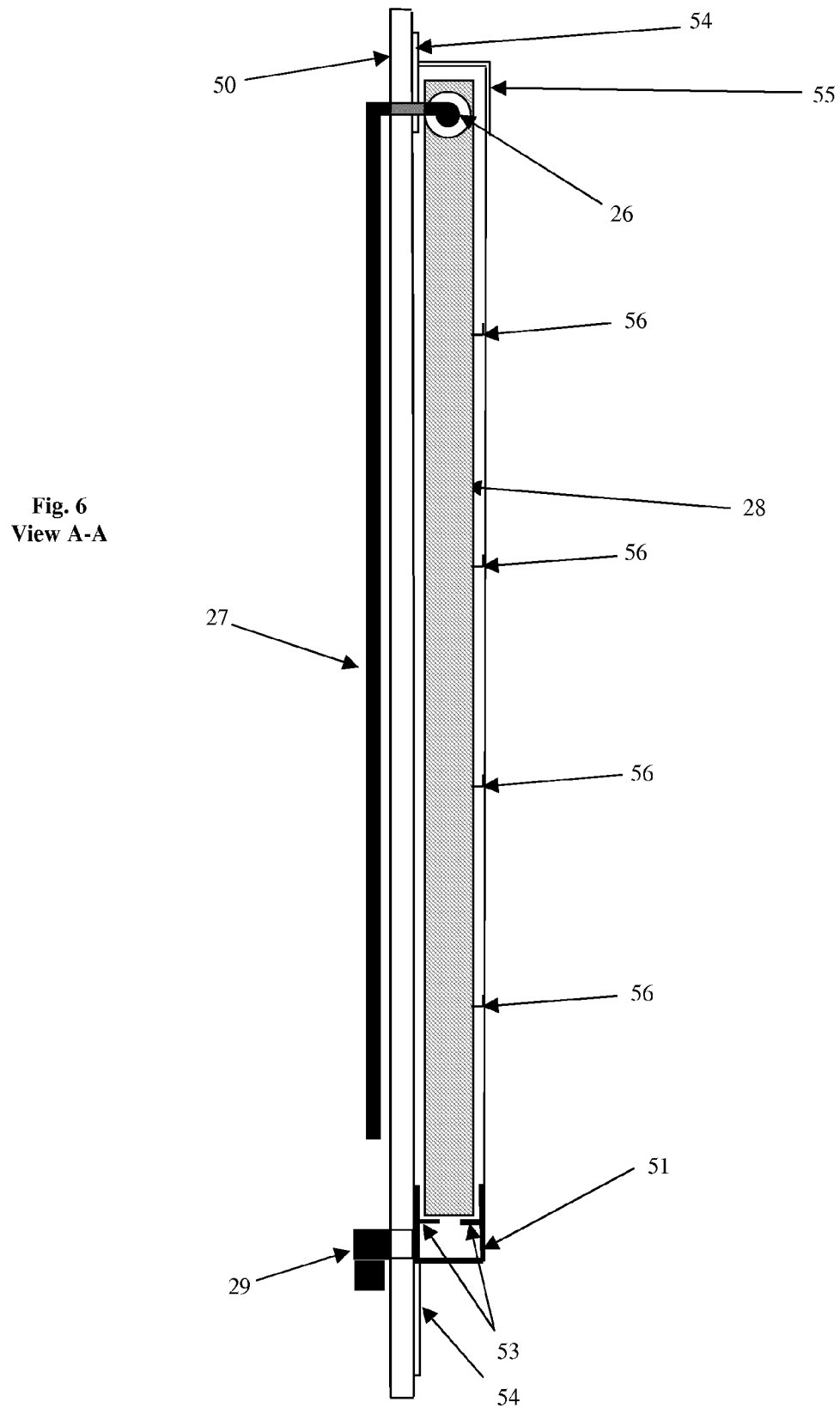
FIG. 6 illustrates a preferred embodiment from a side cut view.
Figure 7:
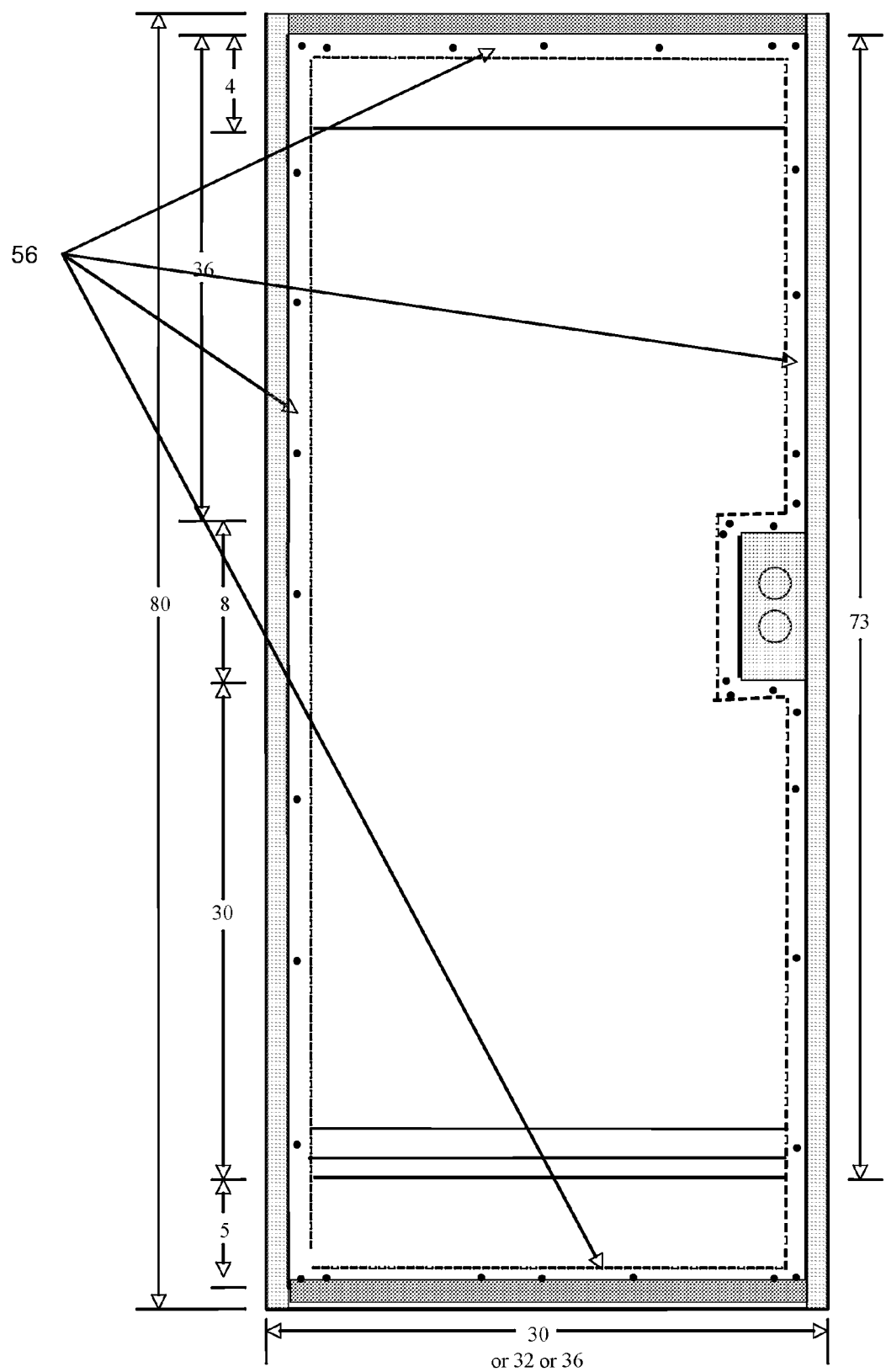
FIG. 7 illustrates a preferred embodiment from the outside view, showing a strip of wire mesh 56 around the inside of the security door frame to support the unit.

The system consists of three primary components, the cool door (FIG. 5-7), the sump assembly (FIG. 2A) and the fan (FIG. 1). Electrical and water service are required. It is recommended that the fan and the pump be wired such that they are controlled by individual switches mounted within the garage. In order to accommodate an optional thermostat, power should be supplied to both units from a common location. Water service may be sourced from any nearby cold water pipe and delivered via ¼ inch tube to the water source fitting (FIG. 2). The cool door is installed per the installation instructions for the donor door. It is recommended for the door to be level when closed. Occasionally small amounts of water can splash from the door, making it preferable for any surrounding material to be water resistant. Installation of an automatic door closer will reduce splashing when the door is closed. In order to clear the doorknob of the service door, the cool door may be mounted on a thicker door facing. Weather stripping should be utilized to eliminate air leaks. The sump assembly should be in close proximity to the door and have an appropriate 110V switched GFCI electrical outlet within ten feet. It should be level and may rest on the surface of the ground or other surface at or below the bottom edge of the door. A length of flexible tubing may be attached to the overflow tube to carry overflow water away to a lower location. The water source tube should be connected to the output of the pump, and the water return tube should be connected to the water return fitting on the sump. Preferably, the fan should be installed in the ceiling diagonally across the room from the cool door, and ideally close to the large exterior garage door if one exists. The installation instructions for the specific fan being installed should be carefully followed. If the structure has external vents leading from its interior to the outside, the interior vent grill(s) should be replaced with unit(s) modified (FIG. 1A) to prevent strong airflow from the outside to the inside of the structure. These units function as reverse flow dampers such that they close while the system is in operation and reopen when it is turned off. It is preferred that all air leaks into the structure be eliminated to the extent possible.

Construction

Figure 3:
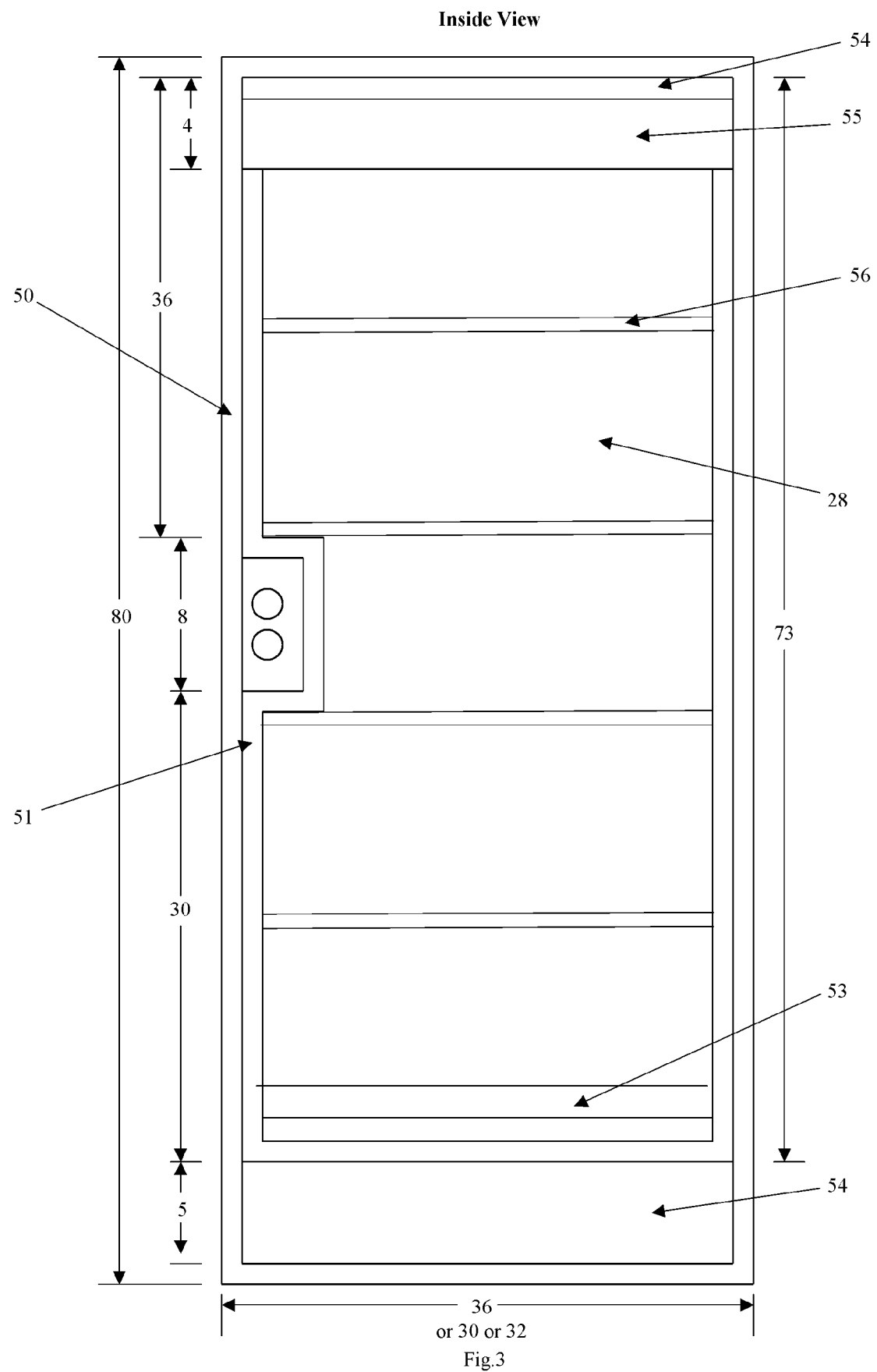
FIG. 3 illustrates a preferred embodiment from an inside view.
Figure 4:
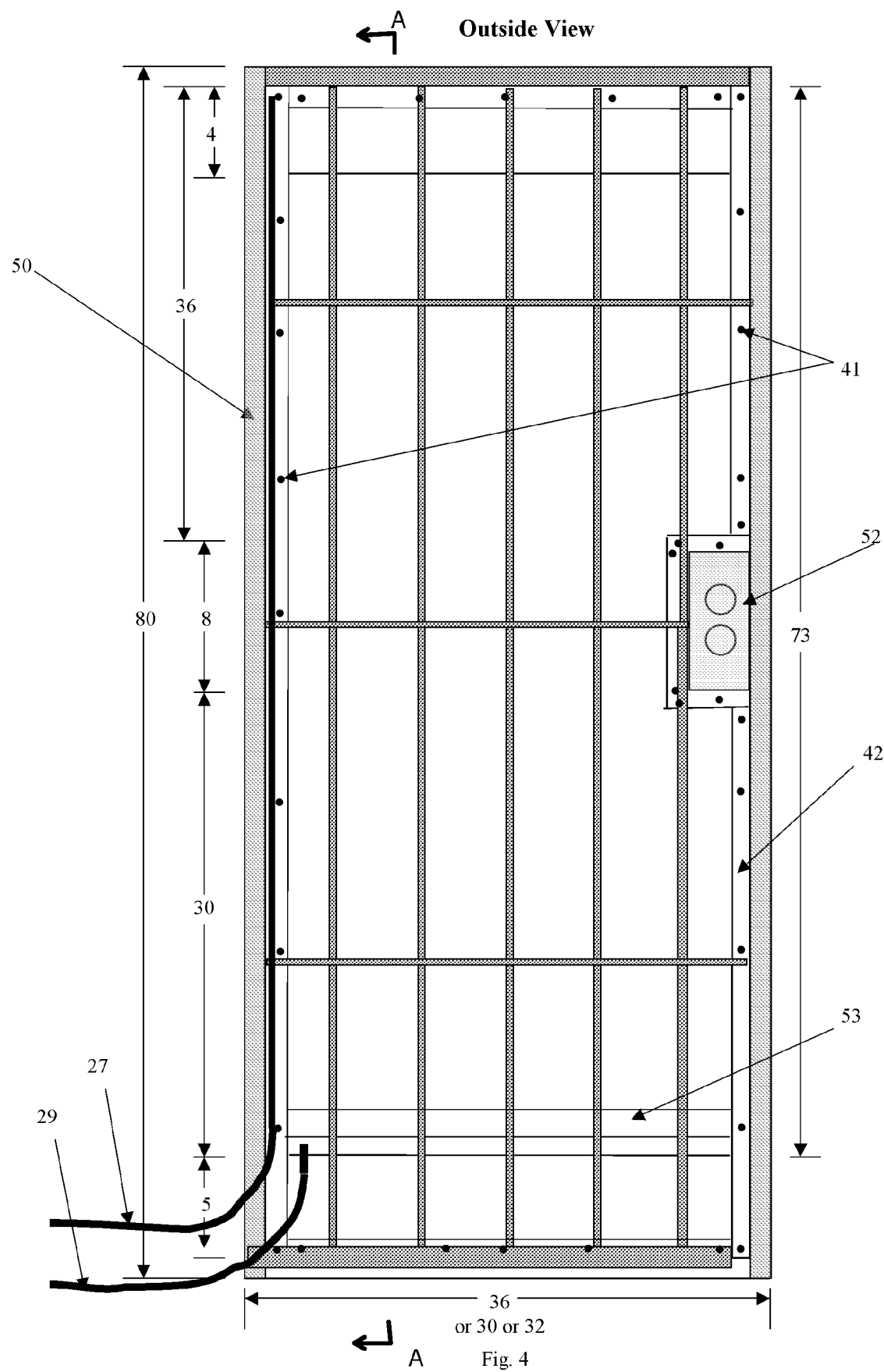
FIG. 4 illustrates a preferred embodiment from the outside view.

The following describes the preferred construction of the preferred embodiment of the system. The cool door (FIGS. 3-5) is constructed by modifying a conventional steel security door 50 to pass a maximum airflow with minimum resistance, and to support the cooling unit of the cool door. The steel mesh 56 is cut away, leaving about one inch of material around the inside of the security door frame to support the unit. The preferred unit utilizes a frame 51. While the frame 51 can be constructed using a variety or suitable materials, sizes and shapes, it is preferred to construct the sides and bottom of the frame 51 from 1×3×1×⅛ inch aluminum channel formed essentially into the shape of a "U". The corners at the bottom and those required for circumventing the lock set 52 are cut at a 45-degree angle and welded together. A media shelf 53, consisting of a 1×2×⅛ aluminum angle, is welded preferably to the legs of the front and back of the frame 51 near the bottom to support the media 28. Cross braces 56 are added to provide rigidity. A 1/16 aluminum panel 54 is preferably attached at the top and bottom of the frame 51. It is preferred not to use a channel shape across the top of the frame 51. Rather, it is preferred to create a cap formed from 3×3×⅛ aluminum angle 55 and removably connect the cap to the top of the frame 51 (by bolting or other suitable method known in the art). A removable cap allows the media 28 to be replaced as needed.

The unit is secured to the security door with ½×20 stainless steel machine screws 41 that pass through a 1×⅛ aluminum bar 42, which reinforces the steel security door mesh 56 that was left during the cutting process. A one-inch hole is bored through the center of the media 28 ½ inch from the top to accommodate the water distribution tube 26, which is connected to the supply tube and has ⅛-inch holes across the top on ½-inch centers. The water distribution tube is preferably supported at either end by the cool door frame 51. A one-inch aluminum drain fixture is welded to the side at the bottom of the frame 51 to channel return water back to the sump through the drain tube 29. (FIG. 6) The cool door is a fully functional security door as defined by the manufacturer of the donor security door product. In order to prevent an intruder from pushing a hand through the media to reach in and unlock the door, a lock set 52 with a dual tumbler dead bolt lock must be utilized.

Figure 2B:
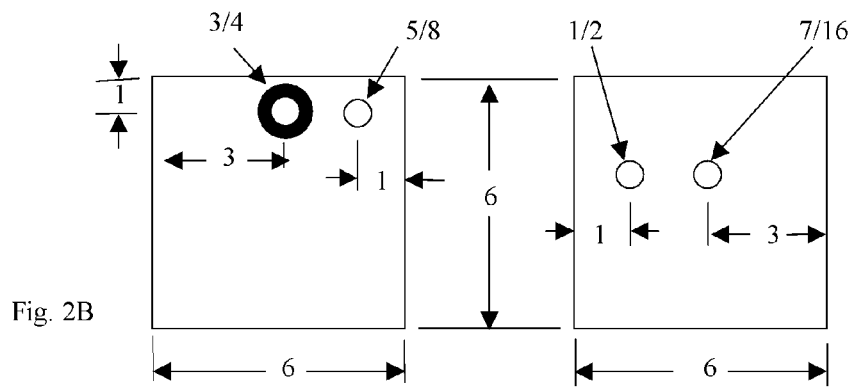
FIG. 2B illustrates a preferred embodiment of the sump assembly from the end views.
Figure 2C:
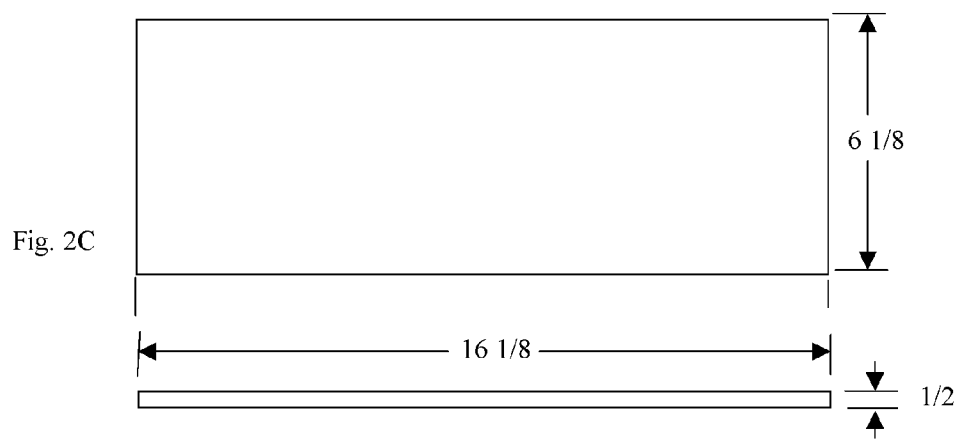
FIG. 2C illustrates a preferred embodiment of the sump assembly cover.

The water circulation (FIG. 3) starts with a 6×6×24 aluminum sump 20 and lid constructed of 16-gauge aluminum sheet with the ends welded into place. Holes are drilled in the end plates (FIG. 2B). The float valve 21 is installed and a ¼-inch water line 22 is attached to the inlet fitting. The submersible pump is attached to the supply tube 27. The drain tube 29 is attached to the appropriate fitting on the sump.

The damper vent (FIG. 1A) is constructed by attaching flexible flaps 18b to the louvers 18c of a standard fresh air vent 18a often found passing through exterior garage walls. The flaps are secured with adhesive 18d. Foam weather stripping 18e is added to enhance sealing.

The exhaust fan is mounted in the ceiling of the structure, ideally diagonally across from the cool door. The preferred fan would be rated at about 4500 CFM or more and installed per the instructions supplied by the manufacturer.

Operation

Anytime that the fan is operating, in order to avoid creating a low pressure condition in the structure, the solid door typically sharing a common door opening with the cool door should be open, or some other large ventilation, such as a garage door should be open. It is preferred that most, if not all the air being drawn in by the fan enter the garage by passing through the cool door and only through the cool door. It is preferred that when starting the system, the pump be turned on several minutes before the fan to saturate the cool door media. Once the media has been wetted, the fan may be switched on and set on either high or low speed. A thermostat may be utilized that controls the pump and fan separately, with the pump starting several minutes before the fan. Starting the system early in the day will help keep the garage cool on very hot days. One should check that the water level in the sump is just below the overflow tube. Once per week, when used on a moderate basis, the sump should be drained and cleaned. A wet/dry shop vacuum is especially useful for this task. The media traps dirt and dust much like a filter. Periodically, it should be gently flushed by spraying it with a garden hose. Much of the captured dust and sand will flow down into the sump where it can be removed during routine cleaning.

As an alternative to weekly cleaning, a commercially available purge-pump may be added to the sump. The purge-pump pumps out the contents of the sump every eight hours of operation which is then replaced with fresh water via the water source and float valve.

Security Door

The cool door is a fully functional security door as defined by the manufacturer of the donor security door product. In order to prevent an intruder from pushing a hand or tool through the media to reach in and unlock the door, a lock set 52 with a dual tumbler dead bolt lock should preferably be utilized. The inside tumbler should require a key to be operated. Therefore the key should be stored out of reach of the unit but in a convenient location to allow ingress and egress as desired.

Although the invention has been described in detail with reference to one or more particular preferred embodiments, persons possessing ordinary skill in the art to which this invention pertains will appreciate that various modifications and enhancements may be made without departing from the spirit and scope of the claims that follow.

What is claimed is:

1. A system for cooling interior residential spaces, the system comprising
   a residential structure having an exterior, the exterior comprising,
   a solid residential door secured to a door frame, and a security door secured to a door frame, the security door comprising a structure housing evaporative media, a re-circulating system in fluid communication with the evaporative media, and a water supply connected to the re-circulating water system, and
   a fan located at least three feet away from the security door, the fan capable of pulling outside fresh air through the door and into the residential structure while pushing air from the inside the residential structure to outside the residential structure;
   wherein the solid residential door and the security door can be operated in at least two modes,
   the first mode being when both doors are shut, the second mode being when the solid door open and the security door shut to allow outside air to pass through the evaporative media and into the interior residential space.

2. The system of claim 1 wherein the second portal is connected to an attic.

3. The system of claim 1 wherein the second portal is connected to a second residential structure.

4. The system of claim 3, wherein the second residential structure is the attic of residential house.

5. The system of claim 1 wherein the door is a security door.

6. The system of claim 1 wherein the door is a steel security door.

7. The system of claim 1, the exterior comprising a third portal, the third portal comprising a reverse flow damper.

8. A security door for cooling residential structures having a solid exterior door secured to a door frame, the security door comprising
   a security door
   connected to the door frame,
   evaporative media housed within a structure connected to the security door,
   a distribution tube having holes inserted into the evaporative media,
   a drain tube connected to the frame,
   wherein the security door and the solid exterior door can both be closed at the same time or either one can be opened and the other is closed.

9. The security door of claim 8, the frame further comprising a media shelf connected to the frame that supports the media, but leaves a space between the bottom of the media shelf and the frame to permit drainage from the media to accumulate on the frame and drain out the drain tube.

10. The security door of claim 8, wherein the distribution tube and drainage tube are connected to a re-circulating system.

11. The security door of claim 8, the security door having an opening that air can pass through, the opening having a strip of wire mesh around the perimeter of the opening and the frame being connected to the wire mesh.

12. The security door of claim 8, the frame comprising aluminum.

* * * * *